United States Patent [19]

Escrig

[11] Patent Number: 4,612,124
[45] Date of Patent: Sep. 16, 1986

[54] METHOD OF SEWAGE TREATMENT

[76] Inventor: Ignacio L. Escrig, Mayor, 2, Villar del Arzobispo, Valencia, Spain

[21] Appl. No.: 687,156

[22] Filed: Dec. 28, 1984

[30] Foreign Application Priority Data

Dec. 30, 1983 [ES] Spain .................................... 528.559

[51] Int. Cl.[4] .............................................. C02F 1/76
[52] U.S. Cl. .................................. 210/721; 210/727; 210/752; 210/753; 210/759; 210/763
[58] Field of Search ............... 210/631, 721, 727, 752, 210/753, 759, 763, 725, 750, 205, 220

[56] References Cited

U.S. PATENT DOCUMENTS

| | | | |
|---|---|---|---|
| 2,643,976 | 6/1953 | Sebald | 210/205 |
| 3,288,708 | 11/1966 | Cordle et al. | 210/753 |
| 3,409,545 | 11/1968 | Albertson | 210/631 |
| 3,530,067 | 9/1970 | Friedman | 210/631 |
| 3,970,554 | 7/1976 | Fischer et al. | 210/753 |
| 3,984,311 | 10/1976 | Diesen et al. | 210/753 |
| 4,007,120 | 2/1977 | Bowen | 210/192 |
| 4,292,176 | 9/1981 | Grutsch et al. | 210/631 |
| 4,294,703 | 10/1981 | Wilms et al. | 210/631 |

FOREIGN PATENT DOCUMENTS

| | | | |
|---|---|---|---|
| 56-155693 | 12/1981 | Japan | 210/721 |
| 58-205599 | 11/1983 | Japan | 210/759 |
| 2056962 | 3/1981 | United Kingdom | 210/721 |

Primary Examiner—Peter Hruskoci
Attorney, Agent, or Firm—Wender Murase & White

[57] ABSTRACT

The present invention discloses a method of sewage effluent treatment comprising oxidizing sewage effluent by reacting hydrogen peroxide with a catalyst selected from the group consisting of potassium iodide and potassium hydroxide, while in communication with the sewage effluent. If desired, the reaction may be initiated with metalloid iodine.

10 Claims, 2 Drawing Figures

METHOD OF SEWAGE TREATMENT

BACKGROUND OF THE INVENTION

This invention relates to a procedure for the purification of sewage effluent through chemical oxidation with nascent oxygen coming from the catalytic decomposition of hydrogen peroxide in continuous reaction with an iodide/iodine pair, or vice-versa.

The Spanish health authorities, as well as those of other countries, have taken the responsibility of purifying sewage before it flows into the sea and natural and artifical water courses, the sewage being derived, from human activites domestic or industrial, the sewage coming from urban areas as well as from unitary or separate sewage systems.

All the current sewage purification processes follow a scientifically established sequential model so that the purification is effective and efficient. This model is as follows:

1. Pretreatment (preliminary treatment)
2. Primary treatment
3. Secondary treatment
4. Tertiary treatment
5. Disinfection Each one of these stages can be, in turn, of various types.

A brief explanation of the above mentioned stages is as follows:

1. Pretreatment (also called preliminary treatment)

Its goal is to eliminate coarse substances, whether floating or not, solids in suspension, sand, oils and non-emulsified greases, which can be accomplished by:

(a) Screening, consisting of passing the sewage through a grille or sieve, having a passage size smaller than the particles to be eliminated.

(b) A sand remover in order to eliminate (by small water flow velocity) the solid substances which settle in the bottom of the pretreatment vessel.

2. Primary treatment

Its goal is the elimination of solids in suspension.

This can be by:

(a) Sedimentation, which reduces the circulation velocity of the sewage until it reaches a value sufficiently low to allow deposition of sedimentary substances in the bottom of the sedimentation basin.

(b) Flocculation/coagulation

As it is known, flocculation is the formation of flocculus by the union of particles in suspension extant in a liquid, while coagulation is flocculation formed by addition of chemical products which are usually called coagulants. Examples are: Alum: $(SO_4)_3Al_2.18H_2O$; Sodium aluminate: $Al_2O_4Na_2$; Ferrous sulfate: $SO_4Fe.7H_2O$, and others known to those skilled in the art.

(c) Filtration, consisting of passing a fluid, which contains substances in suspension, through a filter medium which allows the fluid to pass through, but not the solid particulates, which are retained in the filter medium. It is an operation which is complementary to coagulation and sedimentation.

The materials most frequently used as filter media are sand, anthracite and diatomaceous earth.

3. Secondary treatment

Its goal is the elimination of soluble inorganic salts and dissolved or partially dissolved organic substances. For this it is necessary that there be a growth of microorganisms (bacteria, fungi, algae, protozoa, rotifera, etc.) with the external contribution of oxygen (aerobic process) or without it (anaerobic process).

With the addition of the mass of microorganisms (also called biomass or biological mass) the dissolved salts, nutrients and organic substance of the sewage is incorporated within the cellular content of the biomass thus reducing its concentration in the sewage.

When oxygen is required (aerobic process), the secondary treatment is known as biological oxidation.

This secondary treatment can be accomplished by:

(a) Stabilization ponds (also called stabilization lagoons).

Such ponds are constructed on the ground at a depth of 1 to 3 meters, and they constitute the simplest process of biological oxidation although they occupy very large areas of land.

They are divided into three categories:

Aerobic ponds: they rely on algae for the supply of oxygen and therefore on sun light. Their depth should be no more than 1.5 meters. For effective purification, sewage retention should be from 2 to 6 days.

Facultative ponds: they function aerobically on the surface and anaerobically at the bottom. Its effective retention time is from 7 to 30 days.

Anaerobic ponds: they are those in which the level of organic substances contained in the sewage is so high that anaerobic conditions are maintained throughout the volume of the liquid. Its effective retention time is from 30 to 50 days.

(b) Aerated lagoons (also called oxidation basins)

They are similar to the stabilization ponds except in the manner in which oxygen is supplied, which is accomplished here by mechanical aerators at the surface.

(c) Percolating filters (also called bacterial beds).

They consist of a bed of stones 10 cm. in diameter with a depth of from 1 to 3 meters, occupying a large area over which, with the aid of a rotary arm, sewage is deposited on the upper part and is purified by the action of the microorganisms present as it flows down.

(d) Sludge activators (also called slush activators)

This consists of aeration in a rectangular tank (5 to 10 hours), followed by a circular sedimentation and contact tank (5 to 15 days). In the first tank there is rapid biological growth due to the oxygen in the air and agitation of the water. In the second tank, mineralization of the organic substance is complete as is the sedimentation of the biological substance (biomass) which is then recirculated to the first tank to make processing more efficient.

4. Tertiary treatment

After the sewage has been subjected to prior treatments, primary and secondary, a high level of products which have not been eliminated by the previous treatments usually remain in solution. These products are usually ionic or molecular. The first category includes soluble mineral salts (heavy and toxic metals) and the second, organic products of high molecular weight (non-biodegradable compounds).

The goal of this tertiary treatment is the elimination of these products. Tertiary treatment can be accomplished by:

(a) Ionic exchange, in which a specific anion or cation is fixed and therefore eliminated from the sewage by passing it through a specific resin.

(b) Adsorption, a physical-chemical surface phenomenon by which certain products with large specific surfaces retain other products in the sewage when they come into contact with the adsorbent product.

(c) Reverse osmosis which is accomplished by applying pressure to a solution in contact with a semipermeable membrane by which the solvent, but not the dissolved, material passes.

5. Disinfection

Water is said to have undergone disinfection treatment when all pathogenic germs have been eliminated.

There are various chemicals which can be used to this end depending on the characteristics of the water to be purified.

Examples: Potassium permanganate; Ozone; Chlorine and its derivatives, and others known to those skilled in the art.

Hydrogen peroxide, which is used in the method of the present invention, is currently used, for example, by the firm of Foret, S.A. to eliminate hydrosulfuric acid and has also been used experimentally by Bayer, S.A. to eliminate hydrazine. Foret, Inc. mixes hydrogen peroxide with sewage and waits until a reaction occurs between the peroxide and the hydrosulfuric acid. They do not use a catalyst. On the other hand, Bayer, AG does not indicate when or where the mixture is made, but they do use a catalyst so the hydrogen peroxide decomposes. In this case the catalyst is a palladium resin. Results obtained are not satisfactory.

SUMMARY OF THE INVENTION

The sewage purification method which is the subject of this invention comprises five stages which allow any type of sewage effluent to undergo efficient chemical-biological purification, accomplished by the successive passage of sewage through five suitable corresponding ponds in each of which a stage of the procedure is carried out. Of these five stages, whose development we will explain following, the first stage refers to the passage of water through the sand remover/flow regulator, and the second consists of the passage through the primary sedimentation; these are already known in this type of sewage purification procedure, while the treatment the sewage receives in the three successive stages is actually the essential subject of the present invention.

In the third stage, the sewage effluent is oxidized by reacting hydrogen peroxide and a catalyst selected from the group consisting of potassium iodide and potassium hydroxide therewith, which releases oxygen gas through the effluent. The reaction may be initiated by the introduction of metalloid iodine. If desired, in the fourth step oxidized sewage effluent undergoes secondary sedimentation and weak oxidation. In an optional fifth step, the sewage is filtered and aerated.

BRIEF DESCRIPTION OF THE DRAWINGS

To facilitate the description of the procedure and only for explanatory purposes, a plate of sketches is enclosed which, in schematic fashion, shows.

It must be clearly indicated that these sketches represent only a schematic model of a purification plant, which is subject to modification for adaptation to suit particular installation requirements, and therefore they should be interpreted in their broadest sense.

DESCRIPTION OF THE PREFERRED EMBODIMENT

Figure 1:
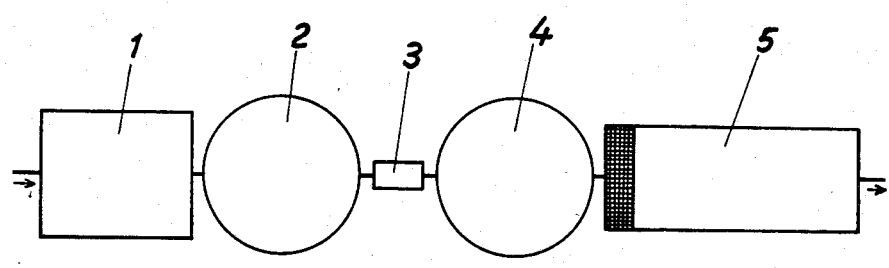
FIG. 1 is a ground plan of an installation or group of ponds or tanks in which the sewage purification procedure of the present invention takes place.
Figure 2:
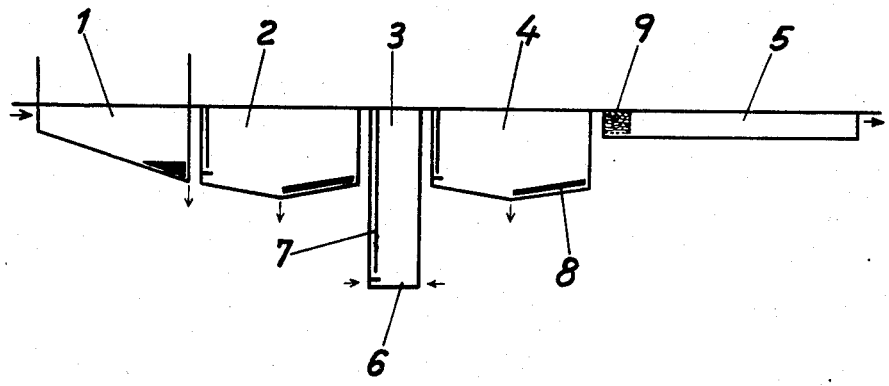
FIG. 2, is a vertical section of FIG. 1.

The ponds or tanks represented in the FIGS. 1 and 2 of the cited sketches and which constitute a purification plant are designated with numerical references corresponding to the successive stages of the procedure carried out in each one, such references designated as follows:

1. Sand remover/flow regulator
2. Primary sedimentation
3. For strong oxidation
4. For weak oxidation/secondary sedimentation/clarification
5. For filtration/agitation/final aeration.

The sewage purification procedure in accordance with the invention includes the following effective stages:

1. Removal of sand and flow regulation.

This is accomplished by introducing the sewage into pond or tank 1 where the following are eliminated: heavy substances whether floating or not; mineral substances subject to sedimentation; oils, greases and non-miscible spume. So that the purification plant can function regularly 24 hours a day, a flow regulator is installed at the outlet of this pond or tank 1 to control a constant and continuous outflow of a determinate volume of sewage effluent.

2. Primary sedimentation.

Primary sedimentation eliminating fine substances in suspension by passing the water into pond or tank 2, leaving it here to accomplish sedimentation.

3. Strong oxidation.

Strong oxidation of the sewage supplied from tank 2 is accomplished in pond or tank 3, into which has been introduced hydrogen peroxide that through catalytic decomposition by a potassium iodide (KI) in contact with the hydrogen peroxide, undergoes a continuous oxidation-reduction according to the following reaction.

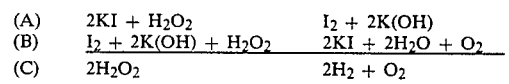

| (A) | $2KI + H_2O_2$ | $I_2 + 2K(OH)$ |
| (B) | $I_2 + 2K(OH) + H_2O_2$ | $2KI + 2H_2O + O_2$ |
| (C) | $2H_2O_2$ | $2H_2 + O_2$ |

The oxygen which is formed disappears from the heart of the reaction as gas which in the total reaction is displaced to the right side of the above-noted reaction equations, thus favoring the decomposition of the hydrogen peroxide.

For this to occur, the pH of the hydrogen peroxide solution must be previously neutralized (pH 7) or nearly neutralized. It is advisable that the pH be less than 7 since in a basic pH (i.e. pH greater than 7) the hydrogen peroxide solution is unstable.

Potassium hydroxide K(OH) is used in concentrated solution as a neutralizing agent, and not in solid form since this, upon dissolving, decomposes the hydrogen peroxide. KI can also be used as a neutralizing agent according to reaction (A), but then the expense of the same series is greater and the reaction does not elapse as sharply.

In the same way, and once the solution of hydrogen peroxide is neutralized with the solution of K(OH), we can initiate the reaction with metalloid iodine ($I_2$). This is the case of the experiments carried out in the laboratory. The order of reactions would then be reversed:

first (B), second (A), but the total reaction (C) would be the same.

The hydrogen peroxide solution used in the laboratory experiments is that which is commercially manufactured for the market by the firm of Foret, S.A. of 30% weight. This has a density of approximately 1.2 grams/ml. Thanks to this density and taking advantage of this property, the hydrogen peroxide solution is not mixed with the residual water to be treated, thereby, forming another liquid cap (at base 6 of chamber 3), and once this cap is formed, it is then broken down with the catalyst.

Sewage is admitted into tank 3 through conduit 7 which is parallel to the walls of the enclosure, and extends a prudent distance from the bottom, thus forming a deflector to the direction of the current in order to stop the entering water from mixing with the hydrogen peroxide on the bottom and interrupting the decomposition process. The already prepared hydrogen peroxide and the catalytic solution (potassium iodide (KI) is introduced in the lower part and level with the floor of said tank 3, making use of the suitable dosimeters for this purpose.

Tank 3 of the process eliminates: dissolved and colloidal organic substances; soluble inorganic substances; organic biological substances. The first precipitated flocculus appears in tank 3, thanks to the rising force of the oxygen gas will never settle in this compartment 3 but will settle in the next compartment.

4. Weak oxidation/Secondary sedimentation/clarification.

The sewage arrives at tank or pond 4 when the following are allowed to settle in order to eliminate them: organic flocculent; insoluble inorganic substances; dead biological substances, these forming a mud or sludge at the bottom of the basin which will be picked up and cleaned by a bottom sweeping machine 8.

A slow oxidation is also produced by the decomposition of the possibly present hydrogen peroxide which the oxygen would have brought along in its rising.

5. Filtration/agitation/final aeration.

Lastly, the sewage will enter pond or tank 5, which is equipped with a series of agitators and jets (not represented in the sketches), distributed throughout the entire basin, by which the following will be eliminated: turbidity by filtration; volatile oxidated products and the rest of the hydrogen peroxide which remains intact.

The five stages of the procedure described are performed in approximately 24 hours.

As previously stated, the pretreatment (preliminary treatment) which in the process of the present invention is called sand removal and flow regulation, and the primary treatment, called primary sedimentation, are common to any well-known sewage purification procedure but not so the rest of the treatment stages included in the subject of this invention with which we eliminate the well-known secondary and tertiary treatment stages, thus making unnecessary biological oxidation with all the disadvantages this involves, such as the formation of biomass, consumption of time and energy and occupation of space. In place, of secondary and tertiary treatment the procedure of the present invention utilizes chemical oxidation by rising oxygen coming from the catalytic decomposition of hydrogen peroxide. In this way the following advantage can be obtained as compared as the conventional procedures:

When compared to known stabilization lagoons the tanks and method of the present invention.

Occupy less land.

Accomplish purification in less time (1 day rather than months).

Are not a reservoir for infection, insects or infestation.

With respect to aerated lagoons, sludge promoters and percolating filters the tanks and method of the present invention;

Occupy less space

Have shorter treatment time (1 day as opposed to 5–10 days)

Minimize electricity expenses

May be utilized for industrial application.

The previously cited well-known conventional systems are not applicable for industrial and mixed sewage, because these impede the growth and viability of the biomass due to the toxic and heavy metal content of these types of sewage.

Eliminate biomass considerations. There is no need to await the growth of the biomass or fear its destruction because it does not go on.

Eliminate recirculation of slush or sludge.

With respect to the processes of ion exchange, reverse osmosis and adsorption, the tanks and method of the present invention:

Requires less investment cost

Have more economical maintenance then chlorination.

Minimizes the creation of salts.

With respect to ozonization.

The oxygen generated from hydrogen peroxide reactions used to practice the present invention is cheaper and more available than ozone.

The procedure which is the purpose of this invention can be applied to the purification of industrial sewage, urban and mixed, containing the following constituents:

(A) Dissolved and colloidal organic substances (B) Very toxic inorganic substances (C) Contaminated inorganic substances (D) Organic biological substances.

The process of the present invention can be carried out in a short period of time (24 hours or less), according to conditions and type, as is shown in the following examples performed in the laboratory:

|  | untreated sewage | treated sewage |
| --- | --- | --- |
| Type 1 coliforms | 20,000,000/100 ml | 0 (zero) |
| Type 2 coliforms | 180,000,000/100 ml | 9,000/100 ml. |
| detergents | 15 mg/liter | 6 mg/liter |
| Type 3 coliforms | 26,000,000/100 ml | 0 (zero) |
| Ammonia | 12 mg/liter | 8 mg/liter |
| Type 4 Iron | 65 mg/liter | .12 mg/liter |
| Type 5 Tin | 350 mg/liter | .76 mg/liter |
| Type 6 Copper | 127 mg/liter | .24 mg/liter |

In all laboratory experiments carried out according to the invention, the following has always been used: 500 ml sewage and 10 ml. Hydrogen Peroxide to 30% in weight (110 volumes) to arrive at a proportion of 1,000 ml sewage/1 ml Hydrogen Peroxide according to conditions and type.

It must be emphasized that the above described procedure which is the subject of the present invention is subject to modification by those skilled in the art which will not change the essential characteristics thereof as claimed as follows.

What is claimed is:

1. A continuous method of sewage effluent treatment comprising the steps of:
   (a) introducing sewage effluent having a density lower than that of a hydrogen peroxide solution into an enclosure having said hydrogen peroxide solution at its bottom in a manner to float a layer of effluent on top of the hydrogen peroxide essentially preventing mixing between the sewage effluent and the hydrogen peroxide; and
   (b) chemically oxidizing the sewage effluent in said enclosure by means of rising oxygen gas, said oxygen gas being formed by reacting the hydrogen peroxide with a catalyst selected from the group consisting of potassium iodide and potassium iodide with potassium hydroxide, while said hydrogen peroxide is in communication with, but essentially unmixed with, the sewage effluent.

2. The method of sewage effluent treatment as recited in claim 1, further comprising initiating said hydrogen peroxide reaction with metalloid iodine.

3. The method of sewage effluent treatment as recited in claim 1, wherein the sewage effluent contains organic flocculent, insoluble inorganic substances and biological substances further comprising the steps of:
   (a) separating by means of sedimentation the organic flocculent, insoluble inorganic substances, and biological substances from the effluent after said oxidizing; and
   (b) decomposing any remaining hydrogen peroxide in the effluent.

4. The method of sewage effluent treatment as recited in claim 1, wherein said hydrogen peroxide is in a solution of between approximately 30 and 50 weight percent, with a density of approximately 1.2 grams/milliliter.

5. The method of sewage effluent treatment as recited in claim 1, wherein said hydrogen peroxide is in a solution having a pH level in the range of approximately pH7 or less before said oxidizing of the effluent.

6. The method of sewage effluent treatment as recited in claim 1, wherein said enclosure has a sidewall, a bottom, and a conduit having an inlet for introducing sewage effluent to said enclosure and an outlet spaced above said bottom, said oxidizing comprises the steps of:
   (a) introducing the sewage effluent into said enclosure through said conduit;
   (b) deflecting the sewage effluent from said outlet away from said bottom with a deflector positioned proximate said outlet; and
   (c) disposing said hydrogen peroxide and said catalyst in said enclosure between said bottom and said outlet thereby preventing mixing between said sewage effluent and said hydrogen peroxide.

7. The continuous method of sewage effluent treatment wherein the sewage effluent contains suspended solids, sand, non-emulsified oils and greases, organic flocculent, insoluble organic substances, biological substances, volatile oxidized products and turbidity comprising:
   (a) separating at least some suspended solids, sand, non-emulsified oils and greases from said effluent;
   (b) separating at least some suspended solids from the effluent by sedimentation;
   (c) introducing sewage effluent having a density lower than that of a hydrogen peroxide solution into an enclosure having said hydrogen peroxide solution at its bottom in a manner to float a layer of effluent on top of the hydrogen peroxide essentially preventing mixing between the sewage effluent and the hydrogen peroxide; (d) chemically oxidizing the effluent, by means of rising oxygen gas, said oxygen gas being formed below said sewage effluent by reacting hydrogen peroxide with a catalyst selected from the group consisting of potassium iodide and potassium iodide with potassium hydroxide while said hydrogen peroxide is in communication with, but essentially unmixed with the effluent;
   (e) separating at least some of the organic flocculent, the insoluble inorganic substances, and the biological substances from the effluent by sedimentation;
   (f) decomposing hydrogen peroxide which may have been carried into the effluent by said raising oxygen gas;
   (g) aerating and agitating the effluent to eliminate volatile oxidized products and any remaining hydrogen peroxide therefrom; and
   (h) filtering the effluent to eliminate any turbidity therefrom.

8. The method of sewage effluent treatment as recited in claim 7, further comprising the step of initiating said hydrogen peroxide reaction with metalloid iodine.

9. The method of sewage effluent treatment as recited in claim 7, wherein said hydrogen peroxide is in a solution of between approximately 30 and 50 weight percent, with a density of approximately 1.2 grams/milliliter.

10. The method of sewage effluent treatment as recited in claim 7, wherein said hydrogen peroxide is in a solution having a pH level in the range of approximately pH7 or less prior to said reaction with the catalyst.

* * * * *